(12) United States Patent
Lentine et al.

(10) Patent No.: US 10,258,152 B1
(45) Date of Patent: Apr. 16, 2019

(54) FOLDABLE SHELVING UNIT WITH PIVOT BLOCK

(71) Applicant: KNAACK LLC, Crystal Lake, IL (US)

(72) Inventors: Tek Lentine, Cary, IL (US); Chung C. Jung, Hoffman Estates, IL (US)

(73) Assignee: KNAACK LLC, Crystal Lake, IL (US)

( * ) Notice: Subject to any disclaimer, the term of this patent is extended or adjusted under 35 U.S.C. 154(b) by 0 days.

(21) Appl. No.: 15/803,981

(22) Filed: Nov. 6, 2017

(51) Int. Cl.
| | |
|---|---|
| *B60R 7/00* | (2006.01) |
| *A47B 43/00* | (2006.01) |
| *A47B 57/04* | (2006.01) |
| *A47B 95/02* | (2006.01) |
| *A47B 96/06* | (2006.01) |

(Continued)

(52) U.S. Cl.
CPC .............. *A47B 43/00* (2013.01); *A47B 57/04* (2013.01); *A47B 96/025* (2013.01); *A47B 96/066* (2013.01); *A47B 96/07* (2013.01); *B60R 7/00* (2013.01)

(58) Field of Classification Search
CPC ........... A47B 43/00; A47B 96/07; A47B 5/04; A47B 96/025; A47B 46/00; A47B 96/06; A47B 96/061; A47B 96/066; A47B 47/022; A47B 57/30; A47B 57/46; A47B 57/42; A47B 57/52; A47B 57/56; A47B 63/04; A47B 46/005; A47B 57/04; A47B 57/045; A47B 96/067; A47B 96/027;

(Continued)

(56) References Cited

U.S. PATENT DOCUMENTS

| 224,863 A | * | 2/1880 | Blessing | .............. | A47B 96/061 |
| | | | | | 248/241 |
| 270,006 A | * | 1/1883 | Bradford | .................. | A47B 1/04 |
| | | | | | 108/81 |

(Continued)

FOREIGN PATENT DOCUMENTS

| CA | 2575104 A1 | 7/2008 |
| CN | 2634059 Y | 8/2004 |

(Continued)

OTHER PUBLICATIONS

Brute Cube Box Van Cargo Trailer 48"×24" Heavy Duty Aluminum Folding Shelving [online]. EBAY.com [retrieved on Apr. 24, 2017]. Retrieved from the Internet: <URL: https:// http://www.ebay.com/itm/like/272201821792>.

(Continued)

*Primary Examiner* — Jennifer E. Novosad
(74) *Attorney, Agent, or Firm* — McDonnell Boehnen Hulbert & Berghoff LLP (57) ABSTRACT

A pivot block for a foldable shelving unit is disclosed. The pivot block includes a body having a first end, a second end, a top edge, a bottom edge, and a cutout portion positioned between the top edge and the bottom edge. The pivot block further includes a first securing portion located at the first end, the first securing portion configured to be secured to a spring, and a second securing portion located at the second end, the second securing portion configured to be secured to a portion of the foldable shelving unit. The pivot block also includes a pivot point located within the cutout portion. The pivot block is configured to assist a shelf of the foldable shelving unit to pivot at the pivot point between a first position and a second position.

20 Claims, 9 Drawing Sheets

(51) Int. Cl.
  *A47B 96/07* (2006.01)
  *A47B 96/02* (2006.01)
(58) Field of Classification Search
  CPC .. A47F 5/0037; A47F 5/12; A47F 5/16; A47F 2005/165; A47F 5/08; B60R 7/00
  USPC ........ 211/90.01, 90.02, 96, 150, 193, 87.01; 108/6, 7, 106, 13, 134, 162, 179, 152; 248/200, 227.2, 227.3, 227.4, 250, 241, 248/242, 240.4
  See application file for complete search history.

(56) References Cited

U.S. PATENT DOCUMENTS

| | | | | |
|---|---|---|---|---|
| 353,991 | A * | 12/1886 | Taylor | A47B 96/027 248/250 |
| 582,799 | A * | 5/1897 | Randow | A47C 9/002 297/314 |
| 755,133 | A * | 3/1904 | Henley | A47B 5/04 248/240.4 |
| 763,061 | A * | 6/1904 | Keil | A47B 57/045 174/161 R |
| 946,337 | A * | 1/1910 | Clear | A47F 3/06 211/150 |
| 1,402,929 | A | 1/1922 | Herpst et al. | |
| 1,576,034 | A * | 3/1926 | Butt | A47B 5/04 108/134 |
| 1,607,887 | A * | 11/1926 | Fowler | A47B 57/045 182/62 |
| 2,038,143 | A * | 4/1936 | Swanson | A47B 5/04 248/240.4 |
| 2,146,310 | A * | 2/1939 | Morgan | A47C 1/12 248/240.4 |
| 2,195,579 | A * | 4/1940 | Lee | E04G 5/06 248/242 |
| 2,577,399 | A * | 12/1951 | Bell | A47B 5/04 108/134 |
| 2,835,522 | A * | 5/1958 | Serto | A47B 1/04 108/82 |
| 2,982,419 | A | 5/1961 | Shiels | |
| 3,032,204 | A | 5/1962 | Sheinberg | |
| 3,185,426 | A * | 5/1965 | Bjerke | A47B 96/061 248/250 |
| 3,203,032 | A | 8/1965 | Everett | |
| 3,451,360 | A | 6/1969 | Lemoyne | |
| 3,463,433 | A * | 8/1969 | Coe | A47B 57/045 108/108 |
| 4,010,697 | A * | 3/1977 | Einhorn | A47B 96/061 108/102 |
| 4,095,311 | A | 6/1978 | Janosch | |
| 4,448,380 | A * | 5/1984 | Huber-Krattiger | A47B 5/04 108/125 |
| 4,572,382 | A | 2/1986 | Niederprum | |
| 4,658,968 | A * | 4/1987 | Mastrodicasa | A47B 46/00 211/153 |
| 4,669,692 | A * | 6/1987 | Mastrodicasa | A47B 46/00 211/134 |
| D294,221 | S * | 2/1988 | Sheftel | 248/242 |
| 4,848,244 | A | 7/1989 | Bennett | |
| 4,927,107 | A * | 5/1990 | Mateo Maria | A47B 5/04 108/134 |
| 4,948,207 | A * | 8/1990 | Rolls | A47B 57/00 248/188.4 |
| 5,064,158 | A * | 11/1991 | Brazier | A47B 96/063 108/152 |
| 5,069,408 | A * | 12/1991 | Bessinger | A47B 96/061 108/108 |
| 5,287,804 | A * | 2/1994 | Compagnone | E04H 3/28 108/147 |
| 5,303,508 | A * | 4/1994 | Porte | B64C 1/1446 123/41.04 |
| 5,452,875 | A * | 9/1995 | Kern | A47B 57/045 108/108 |
| 5,456,435 | A | 10/1995 | Sweeney | |
| 5,526,944 | A * | 6/1996 | Merl | A47F 5/0081 108/108 |
| 5,592,886 | A * | 1/1997 | Williams | A47B 57/52 108/108 |
| 5,865,410 | A * | 2/1999 | Horen | E04G 5/062 248/242 |
| 6,019,331 | A * | 2/2000 | Hoogland | A47B 96/061 108/108 |
| 6,038,986 | A * | 3/2000 | Ransil | A47B 9/02 108/145 |
| 6,189,945 | B1 | 2/2001 | Rockett | |
| 6,234,328 | B1 * | 5/2001 | Mason | A47B 57/045 211/150 |
| 6,332,660 | B1 * | 12/2001 | Salice | E05D 15/262 160/207 |
| 6,357,609 | B1 * | 3/2002 | Van Noord | A47B 45/00 108/65 |
| 6,487,979 | B2 * | 12/2002 | Ash | A47B 5/02 108/134 |
| 6,705,476 | B2 | 3/2004 | Linder et al. | |
| 6,722,620 | B2 | 4/2004 | Rieger | |
| 7,367,616 | B2 * | 5/2008 | Summerford | A47C 9/06 297/14 |
| 7,703,734 | B2 * | 4/2010 | Chen | A47B 88/43 108/108 |
| 7,757,615 | B2 | 7/2010 | McDonald, II et al. | |
| 7,762,406 | B2 | 7/2010 | Qiang | |
| D639,150 | S | 6/2011 | Olson et al. | |
| 8,038,112 | B2 | 10/2011 | Kluge | |
| 8,113,608 | B2 | 2/2012 | Tassin et al. | |
| 8,123,185 | B2 * | 2/2012 | Winig | A47B 57/408 211/90.01 |
| D665,656 | S | 8/2012 | Anzelmo | |
| 8,267,017 | B1 * | 9/2012 | Michael | A47B 5/04 108/134 |
| 8,321,996 | B2 * | 12/2012 | Hirtsiefer | E05D 3/14 16/286 |
| 8,365,676 | B1 | 2/2013 | McAuliff | |
| 8,561,952 | B2 * | 10/2013 | Pfeiler | F16M 11/045 248/187.1 |
| 8,567,734 | B2 * | 10/2013 | McCoy | F16L 3/223 211/186 |
| D709,358 | S | 7/2014 | Fugett | |
| 8,919,715 | B2 | 12/2014 | Terada | |
| 9,004,427 | B2 | 4/2015 | Irudayaraj et al. | |
| 9,119,470 | B2 * | 9/2015 | Kreyenkamp | A47B 81/002 |
| 9,545,154 | B2 | 1/2017 | Duke | |
| D787,304 | S | 5/2017 | Rathman | |
| 2003/0192844 | A1 * | 10/2003 | Winig | A47B 96/027 211/90.02 |
| 2004/0104324 | A1 * | 6/2004 | Oberhaus | A47B 96/028 248/250 |
| 2005/0206282 | A1 | 9/2005 | Walburn | |
| 2005/0211140 | A1 * | 9/2005 | McDonald, II | A47B 46/005 108/108 |
| 2007/0012637 | A1 * | 1/2007 | Yu | A47B 46/005 211/96 |
| 2008/0156950 | A1 * | 7/2008 | Rutz | A47B 96/028 248/250 |
| 2009/0173705 | A1 * | 7/2009 | Stingel, III | B65G 1/026 211/150 |
| 2010/0176262 | A1 * | 7/2010 | Vican | B62D 25/147 248/250 |
| 2011/0108498 | A1 * | 5/2011 | Haeberlein | F24S 25/33 211/4 |
| 2013/0320180 | A1 * | 12/2013 | Castellanos | F16M 13/02 248/534 |
| 2015/0305493 | A1 * | 10/2015 | Garcia | A47B 46/005 211/86.01 |
| 2015/0366338 | A1 | 12/2015 | Conod | |

FOREIGN PATENT DOCUMENTS

| | | |
|---|---|---|
| CN | 203958014 U | 11/2014 |
| EP | 0900904 A2 | 3/1999 |

(56) References Cited

FOREIGN PATENT DOCUMENTS

| EP | 0989273 B1 | 1/2004 |
|---|---|---|
| EP | 2581264 A1 | 4/2013 |
| ES | 1072359 U | 6/2010 |
| GB | 175451 A | 2/1922 |
| GB | 2501531 A | 10/2013 |
| KR | 20130002392 U | 4/2013 |
| WO | 2012/059168 A1 | 5/2012 |

OTHER PUBLICATIONS

FoldAway Foldable Van Shelving—Ranger Design [online]. Rangerdesign.com [retrieved on Apr. 24, 2017]. Retrieved from the Internet: <URL: http://rangerdesign.com/foldawayshelving/>.
Morgan Olson Package Delivery Shelving Solution, Product Literature [online]. http://morganolson.com [retrieved on Apr. 24, 2017]. Retrieved from the internet: <http://morganolson.com/wp-content/uploads/2014/12/Morgan_Olson_SHELVINGgeneric.pdf.

\* cited by examiner

FOLDABLE SHELVING UNIT WITH PIVOT BLOCK

CROSS REFERENCE TO RELATED APPLICATIONS

The present application is related to design application entitled "PIVOT BLOCK FOR FOLDABLE SHELVING UNIT" filed Nov. 6, 2017, bearing MBHB 29/624,916.

BACKGROUND

A. Field

This disclosure relates generally to shelving units, and more particularly to a foldable shelving unit for use in a vehicle.

B. Description of Related Art

Shelving systems for vehicles are known. Typical shelving systems include stationary or rigid shelves. More recently, foldable shelves are used that are movable between stowed and use positions. The foldable shelving systems are also removable, which adds flexibility to the utility of the vehicle.

Current technologies require assembly of the foldable shelving system prior to shipment, and require several hours to repair if components fail (e.g., gas spring). It may be useful, therefore, to provide a foldable shelving system that is designed for easier assembly and repair.

SUMMARY

The following embodiments and aspects thereof are described and illustrated in conjunction with systems, tools and methods which are meant to be exemplary and illustrative, not limiting in scope.

In one aspect, a pivot block for use in a foldable shelving unit is disclosed. The pivot block includes a body having a first end, a second end, a top edge, a bottom edge, and a cutout portion positioned between the top edge and the bottom edge. The pivot block further includes a first securing portion located at the first end, the first securing portion configured to be secured to a spring, and a second securing portion located at the second end, the second securing portion configured to be secured to a portion of the foldable shelving unit. The pivot block also includes a pivot point located within the cutout portion. The pivot block is configured to assist a shelf of the foldable shelving unit to pivot at the pivot point between a first position and a second position.

In another aspect, the pivot block includes a body having a first end, a second end, a top edge, a bottom edge, and a cutout portion positioned between the top edge and the bottom edge. The pivot block further includes a first securing portion located at the first end, the first securing portion comprising a first aperture configured to be secured to a spring, and a second securing portion located at the second end, the second securing portion being generally U-shaped and including two spaced apart outwardly extending projections connected by an upwardly extending wall. Each of the outwardly extending projections includes a plurality of apertures configured to be secured to a portion of the foldable shelving unit. The pivot block also includes a pivot point located within the cutout portion. The pivot block is configured to assist a shelf of the foldable shelving unit to pivot at the pivot point between a first position and a second position.

In yet another embodiment, a foldable shelving unit is disclosed. The foldable shelving unit includes a shelf having a first end, a second end, a top surface, and a bottom surface, and the shelf is configured to be secured to a support beam by a pivot block. The pivot block includes a body having a first end, a second end, a top edge, a bottom edge, and a cutout portion positioned between the top edge and the bottom edge. The pivot block further includes a first securing portion located at the first end, the first securing portion configured to be secured to a spring, and a second securing portion located at the second end, the second securing portion configured to be secured to the support beam. The pivot block also includes a pivot point located within the cutout portion. The foldable shelving unit further includes a support member secured to the bottom surface of the shelf, and a hinge secured to the bottom surface of the shelf and to the pivot point of the pivot block. The pivot block is configured to assist the shelf of the foldable shelving system to pivot at the pivot point between a first position and a second position.

In addition to the exemplary aspects and embodiments described above, further aspects and embodiments will become apparent by reference to the drawings and by study of the following detailed description.

BRIEF DESCRIPTION OF THE FIGURES

Exemplary embodiments are illustrated in the drawings. It is intended that the embodiments and figures disclosed herein are to be considered illustrative rather than restrictive.

DETAILED DESCRIPTION

A pivot block for use with a foldable shelving unit is disclosed. In one embodiment, the pivot block attaches to a vertical support beam or upright which may be located within a vehicle. The pivot block includes mounting features that are secured to the vertical beam. The pivot block provides a pivot point and landing surface for an attached shelf so that the shelf is supported in both the horizontal and vertical positions, and is free to rotate between the two positions. The pivot block includes a pivot point that accepts a standard bushing and pin. The features of the pivot block and location of the pivot point allow the attached shelf to pivot approximately 90 degrees from horizontal to vertical without interference from the attached beam.

The pivot block also provides a fastening location for a gas spring that attaches to the shelf, and assists the movement of the shelf between the vertical and horizontal positions. The pivot block includes a top edge that transfers the shelf load into the vertical support beam and is designed to handle heavy loads that will be seen in parcel delivery applications while the vehicle is in motion.

Figure 1A:
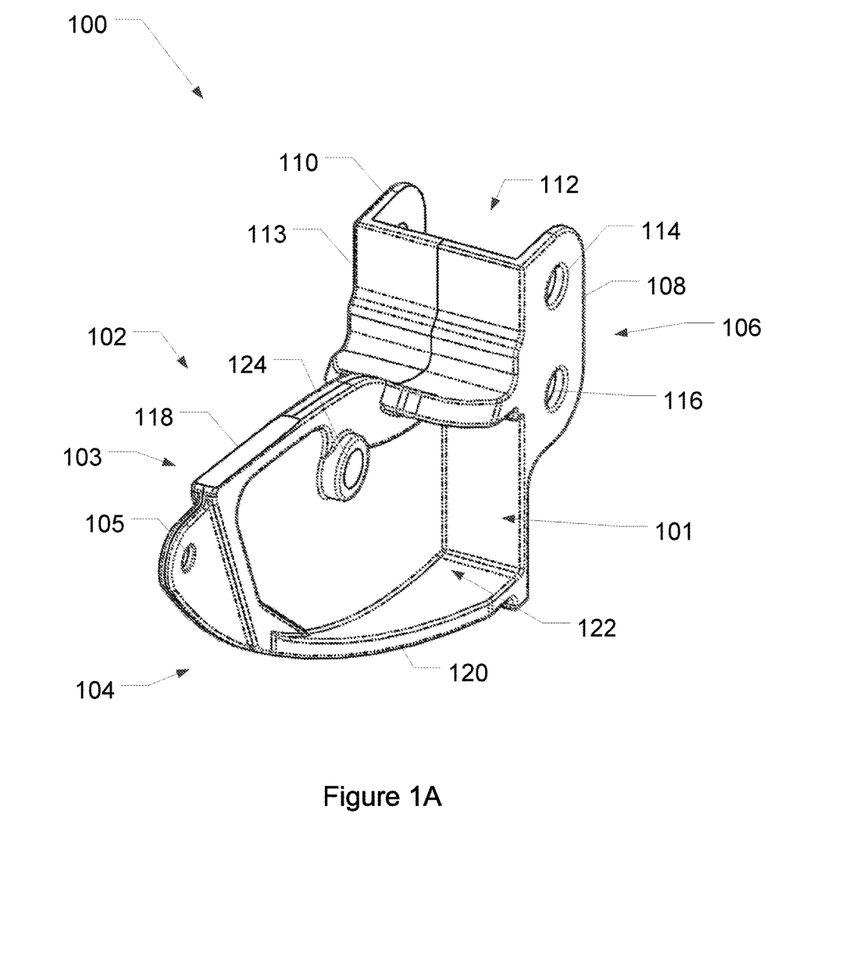
FIG. 1A is a perspective view of an example pivot block of the present application.
Figure 1B:
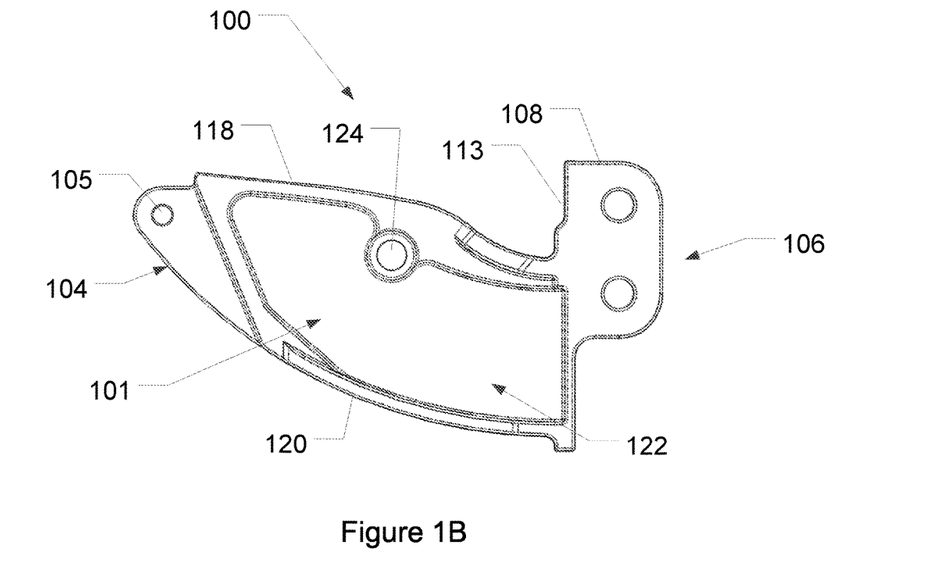
FIG. 1B is a right side view of the pivot block shown in FIG. 1A.
Figure 1C:
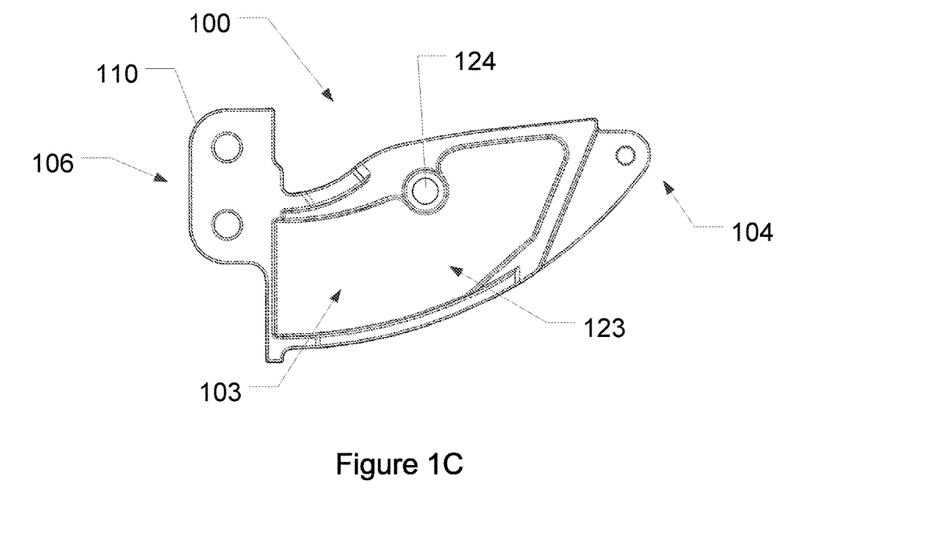
FIG. 1C is a left side view of the pivot block shown in FIG. 1A.

Referring to FIGS. 1A-1C, an example pivot block 100 is disclosed. The pivot block 100 includes a body 102 having a first end 104 and a second end 106. In some embodiments, the pivot block 100 may comprise a first face 101 and a second face 103 opposite the first face. In some embodiments, the second face 103 may generally be a mirror image of the first face 101. In alternate embodiments, the second face 103 may be different than the first face 101.

The first end 104 has a first securing portion 105, which may take the form of an aperture, for example. The first securing portion 105 is configured to be secured to a spring, such as a gas spring 300 (shown in FIGS. 2-3 and 5-6), for example, which will be described in more detail below. It should be understood that any suitable securing mechanism may be used to secure the first end 104 of the pivot block 100 to the gas spring. The securing portion 105 allows for an over-center design that holds a shelf 204 (described below) in both the vertical and horizontal positions. An over-center spring design is one in which the spring force switches the direction it acts upon an object as the spring crosses a neutral axis. This causes the spring to push the shelf down when the shelf is in the horizontal position, and then change to push the shelf up when the shelf is rotated to the vertical position.

The second end 106 of the pivot block 100 has a second securing portion which is generally U-shaped. Thus, as shown in FIG. 1A, the second securing portion may comprise one or more outwardly extending projections 108, 110 separated by a space 112, and connected by an upwardly extending wall 113. The upwardly extending wall 113 may include a thickened area used to withstand stresses experienced when the shelf 204 is in the horizontal position. In one embodiment, each projection 108, 110 includes one or more fastening mechanisms in the form of apertures 114, 116. The second end 106 of the pivot block is configured to be mounted to a vertical support beam or upright 202 (shown in FIG. 2) of a foldable shelving unit which is fixed to an interior wall of a vehicle, such as a van 400 shown in FIG. 8, for example. It should be understood that in other embodiments any other suitable fastening mechanism may be used to secure the second end 106 of the pivot block 100 to the vehicle.

Referring again to FIGS. 1A-1C, the body 102 of the pivot block 100 may further include a top edge 118, a bottom edge 120, and a cutout portion 122 located on the first face 101 between the top edge and bottom edge. The top edge 118 includes a flat surface that contacts the shelf 204 in the horizontal position. The flat surface transfers the shelf load into the vertical support beam 202 to which the pivot block is fastened. The bottom edge 120 is shown as having a curved portion. In other embodiments, the top and bottom edges 118, 120 may take alternate shapes as well. The cutout portion 122 supports a portion of the shelf load, but carries less of the load and can therefore be thinner than the rest of the pivot block.

As mentioned above, the second face 103 may be generally a mirror image of the first face 101, and therefore all of the elements listed above on the first face 101 may also be present on the second face 103 of the pivot block 100 including, a second cutout portion 123. The second cutout portion 123 may be substantially identical to the cutout portion 122.

The body 102 may also include a pivot point 124 extending through the body 102. As shown in FIGS. 1A and 1B, the pivot point 124 may extend from the top edge 118, and is configured as an opening that protrudes within the cutout portion 122. The pivot point 124 is configured to connect the pivot block 100 to a hinge 214 (shown in FIGS. 2-3) which secures the pivot block to a shelf 204 and pivots to move the shelf between a folded (vertical) and unfolded (horizontal) position. Although the opening of the pivot point 124 is shown as being circular, it should be understood that the opening may take other suitable shapes in alternate embodiments.

FIGS. 2-7 show an example foldable shelving unit 200 using pivot block 100 of the present application. The foldable shelving unit 200 is attached to a support beam or upright 202 which may be hollow, and may be made of steel, for example. In one embodiment, the beam 202 is secured to an interior wall of a vehicle, such as a van (shown in FIG. 8).

Figure 2:
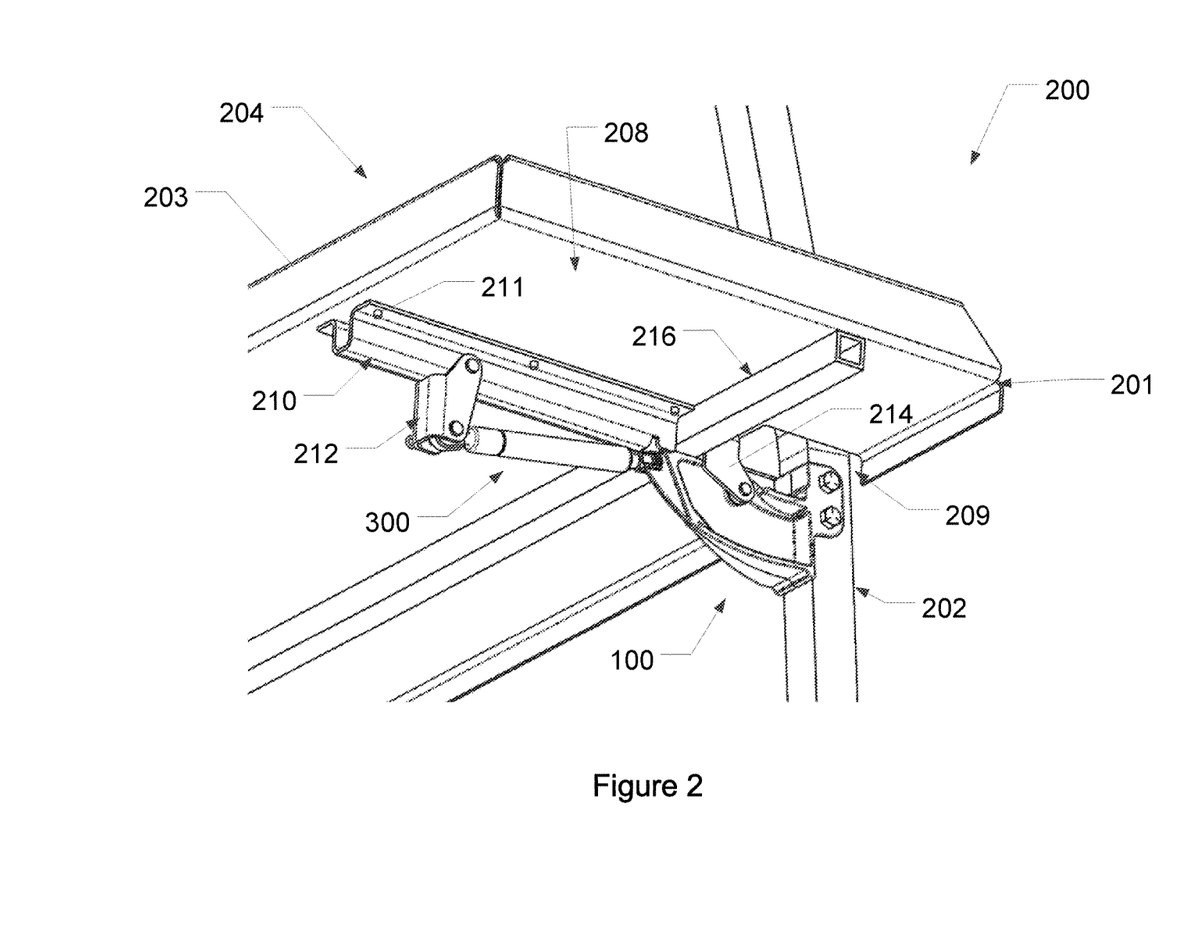
FIG. 2 is a bottom perspective view of the pivot block shown in FIG. 1 in use with a foldable shelving system in a horizontal position.
Figure 3:
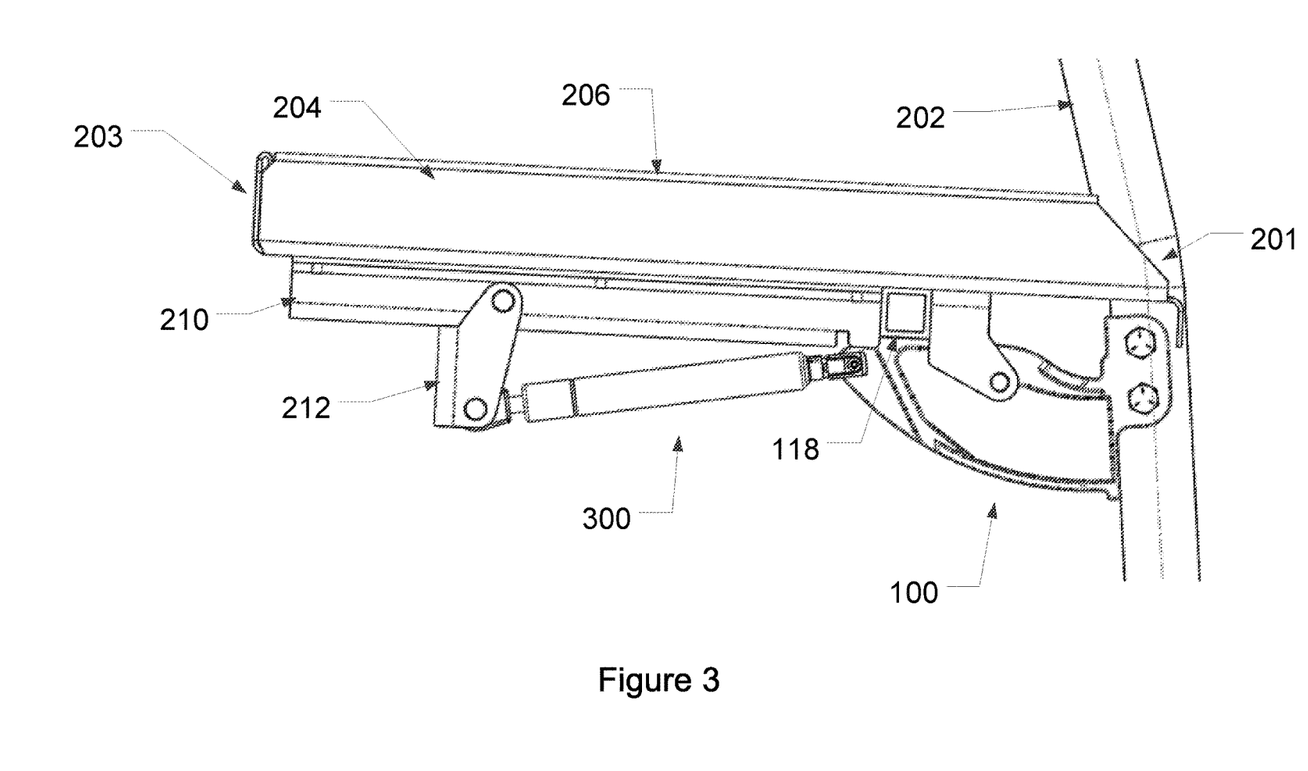
FIG. 3 is a side view of the foldable shelving system and pivot block shown in FIG. 2.
Figure 4:
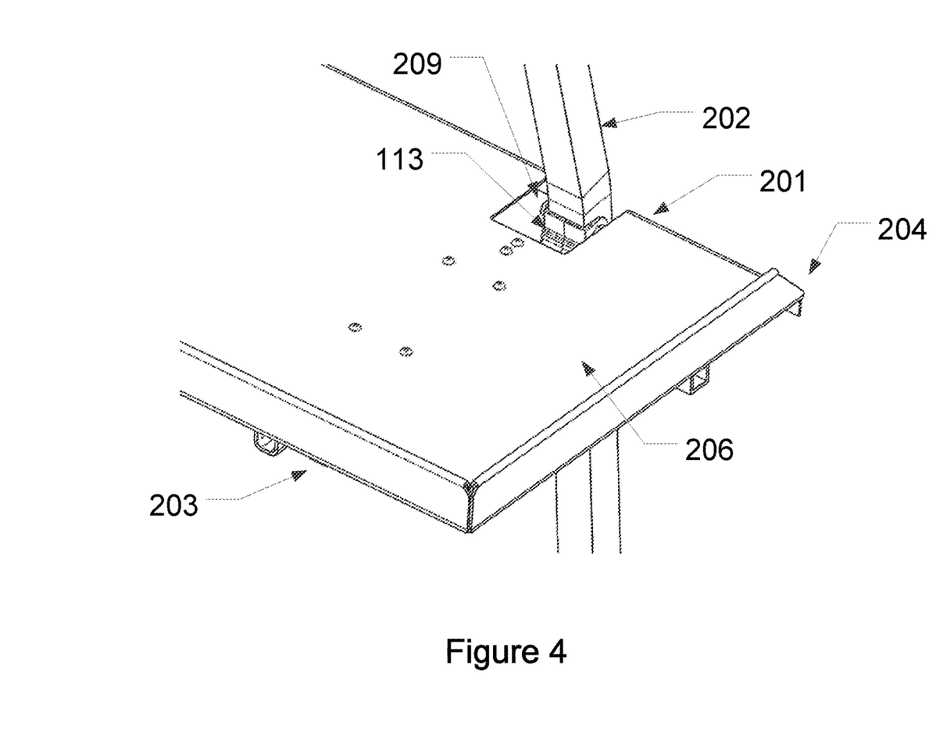
FIG. 4 is a top perspective view of the foldable shelving system and pivot block shown in FIG. 2.
Figure 5:
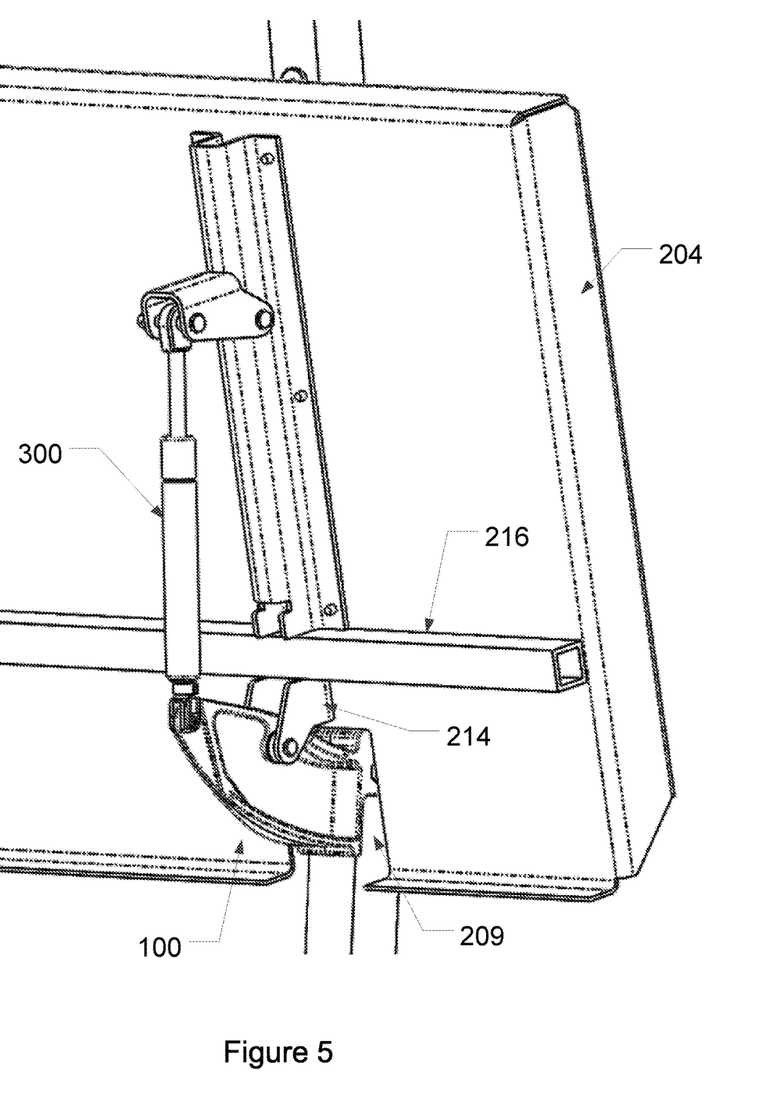
FIG. 5 is a bottom perspective view of the foldable shelving system and pivot block of FIG. 2 shown in a vertical position.
Figure 6:
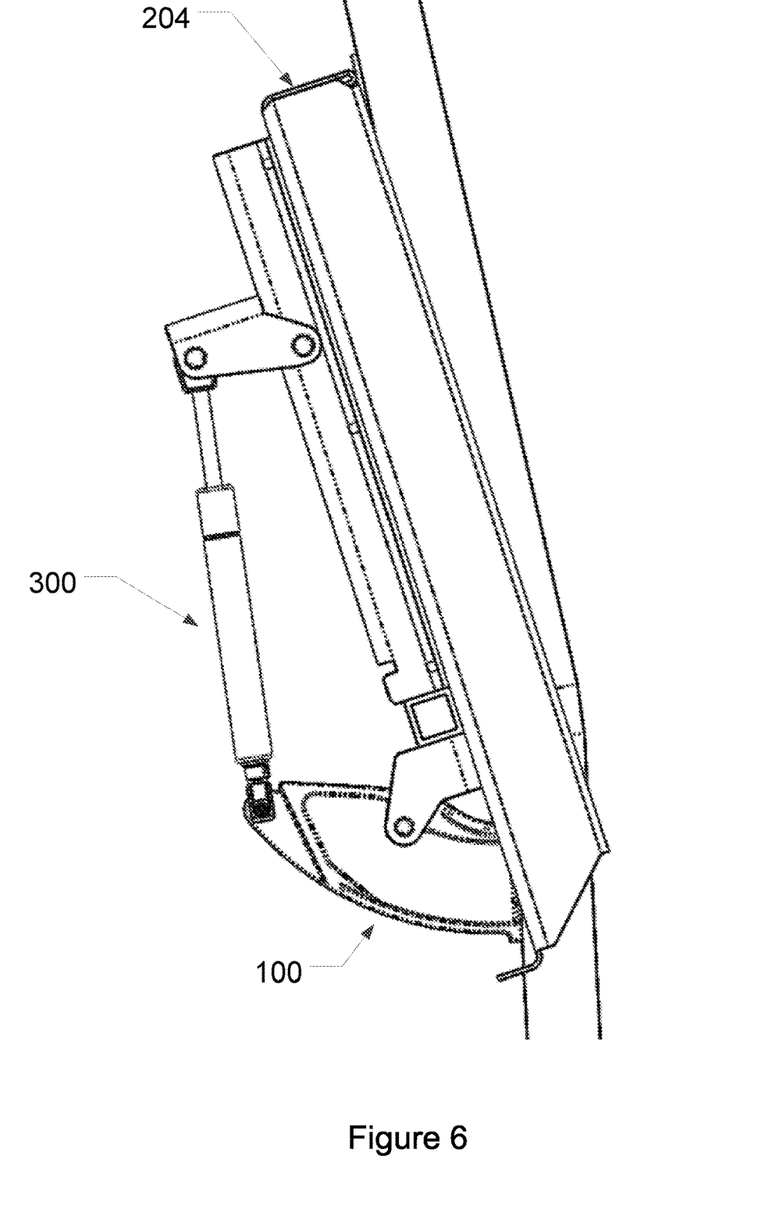
FIG. 6 is a side view of the foldable shelving system and pivot block shown in FIG. 5.
Figure 7:
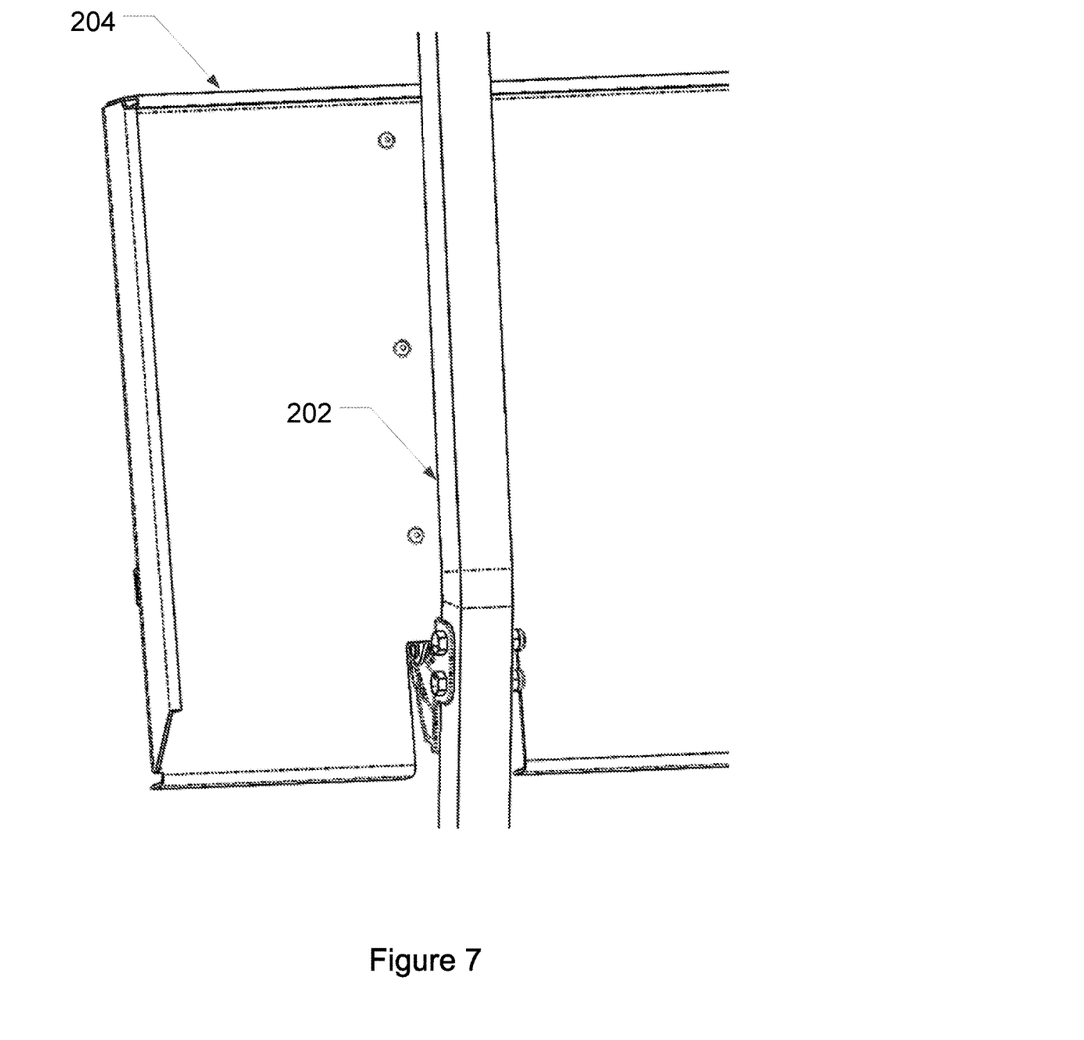
FIG. 7 is another view of the foldable shelving system and pivot block shown in FIG. 5.

The foldable shelving unit 200 includes a shelf 204 which is configured to move from a first unfolded, substantially horizontal position, as shown in FIGS. 2-4, to a second, folded substantially vertical position, as shown in FIGS. 5-7. The shelf has a first end 201 positioned adjacent the beam 202 and a second end 203 opposite the first end 201. The first end 201 has a notch 209 (best seen in FIG. 4) to accommodate the beam 202 when the shelf 204 is in both the horizontal and vertical positions. Although the notch 209 is shown as having a substantially rectangular shape, it should be understood that the notch may take other suitable shapes in some embodiments. The shelf 204 further includes a top surface 206 upon which items can rest when the shelf is in the horizontal position, and a bottom surface 208 opposite the top surface.

The foldable shelving unit 200 further includes a support member 210 secured to the bottom surface 208 of the shelf 204. In one embodiment, the support member 210 is secured to the shelf 204 with one or more fasteners 211. It should be understood that any suitable fastening means could be used to secure the support member 210 to the shelf 204. The support member 210 is a structural member which supports the shelf load.

The foldable shelving unit 200 may further include a bracket 212 which secures the gas spring 300 to the support member 210 of the shelf 204. It should be understood that any suitable known spring may be used. The gas spring 300 is readily accessible for ease of replacement. The gas spring 300 serves to control movement of the shelf 204 by slowing the movement of the shelf 204 when being raised into the folded position and when being lowered into the unfolded position. The gas spring 300 further functions to prevent the shelf 204 from falling when in the folded position, and from moving upward to the folded position when in the unfolded position. In some embodiments, the bracket 212 is not present and the gas spring 300 may be directly connected to the support member 210.

Still further, the foldable shelving unit 200 further includes a hinge 214 to secure the pivot block 100 to the shelf 204 at the opening 124. The hinge 214 pivots to move the shelf 204 between the horizontal, unfolded and vertical, folded positions. The hinge 214 may be secured to the bottom surface 208 of the shelf 204 by any suitable fastening mechanism.

The foldable shelving unit 200 may further include a cross beam 216 secured to the bottom surface 208 of the shelf 204 for additional support of the shelf load. The cross beam 216 may be secured to the bottom surface 208 of the shelf 204 by any suitable fastening mechanism.

In use, the foldable shelving unit 200 may be in the first or horizontal position so that a user may store various objects on the shelf 204. When the shelf is no longer in use, a user may lift the shelf upwardly toward the wall of the vehicle, which releases the gas spring 300. This causes the hinge 214 to rotate about the pivot point 124. Thus, once in the vertical position, the weight of the shelf 204 is transferred from the support member 210 to the beam 202. The second end 203 of the shelf is held against the beam 202 by the spring force from the gas spring 300 when in the vertical position. The weight of the shelf 204 is supported through the hinge 214 at the pivot point 124 when in the vertical position. The notch 209 allows the shelf 204 to move into the vertical position, which may be approximately 90°, without interference from the beam 202. Once in the vertical position, the gas spring 300 prevents the shelf 204 from falling back into the horizontal position.

To move the shelf 204 back into the horizontal position, a user pushes down on the shelf away from the wall of the vehicle, which releases the gas spring 300. The hinge 214 then rotates about the pivot point 124 and the shelf 204 continues to move downward into the horizontal position. Once in the horizontal position, the shelf 204 rests on the top edge 118 of the pivot block 100, and the gas spring 300 prevents the shelf 204 from moving upward into the vertical position.

Figure 8:
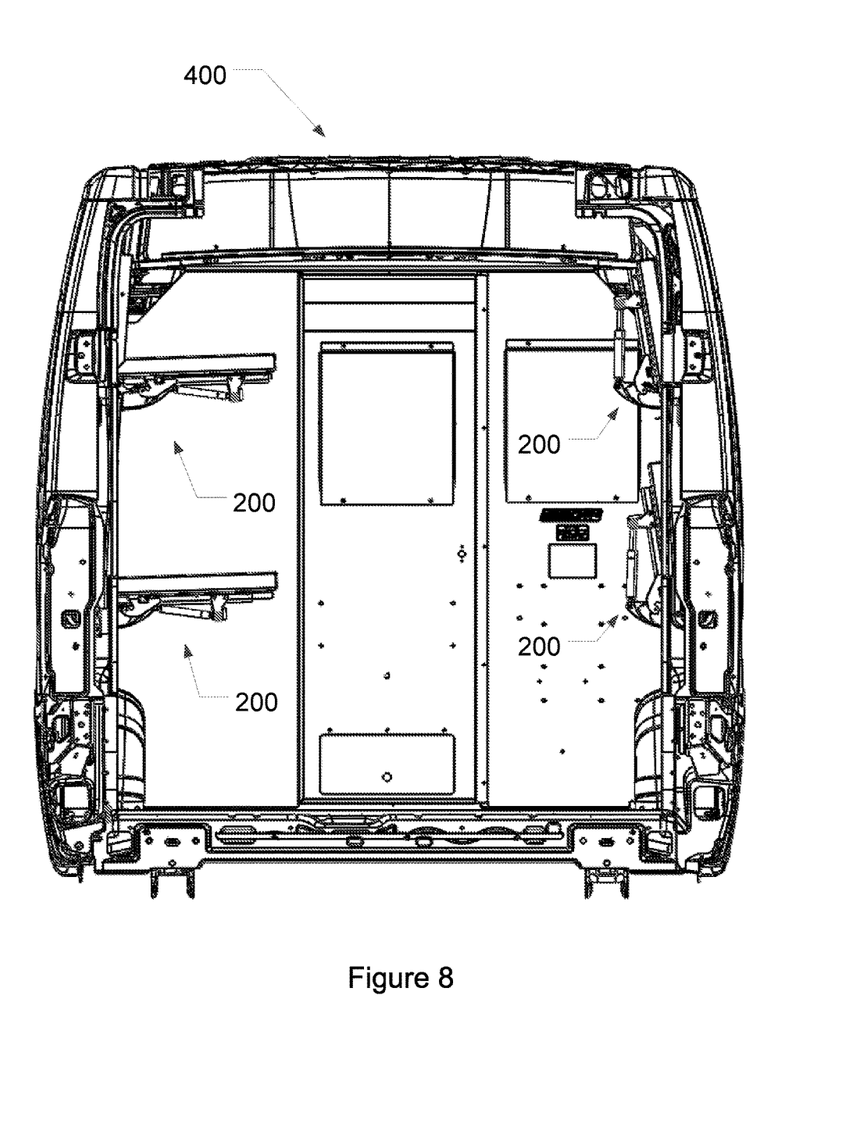
FIG. 8 shows the interior of an example vehicle equipped with the foldable shelving unit of the present application, with one side showing the system in the vertical position and the other side in the horizontal position.

As shown in FIG. 8, in one example, a plurality of foldable shelving units 200 may be attached to a plurality of vertical beams or uprights 202 positioned within the interior of a vehicle 400.

In one embodiment the pivot block 100 is molded as a single, unitary, integral piece. In another embodiment, the pivot block 100 may be molded as separate pieces which are connected together. In one example, the body 102 may be constructed from a lightweight metal, such as aluminum. In other embodiments, the body may be made of steel, magnesium, zinc, or polymeric material. Other suitable materials may be used as well.

In one embodiment, the pivot block 100 is made using an aluminum die cast process which allows for the geometry needed to achieve the appropriate strength and function of the pivot block. The aluminum die cast process allows for the use of aluminum which is lightweight compared to steel supports commonly used in the industry. The aluminum die cast process is also economical and provides parts for a lower price than that of the known formed sheet metal designs and machined designs.

It should be understood that in alternate embodiments the pivot block may be constructed by any suitable known method.

Additionally, the pivot block of the present application achieves the strength necessary to meet the demands of a parcel delivery application with fewer supports than other shelving systems. The geometry and manufacturing process of the pivot block reduce the number of beams and other components needed in the shelving system, which allows for a lighter weight and lower cost shelving system that outperforms other known shelving systems.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. A pivot block for a foldable shelving unit comprising:
a body having a first end, a second end, a top edge, a bottom edge, and a cutout portion positioned between the top edge and the bottom edge and between the first end and the second end;
a first securing portion located at the first end, the first securing portion configured to be secured to a spring;
a second securing portion located at the second end, the second securing portion configured to be secured to a portion of the foldable shelving unit; and
a pivot point located within the cutout portion;
wherein the pivot block is configured to assist a shelf of the foldable shelving unit to pivot at the pivot point between a first position and a second position.

2. The pivot block of claim 1 further comprising a first face and a second face opposite the first face, wherein the second face is a mirror image of the first face.

3. The pivot block of claim 1 wherein the first securing portion includes a first aperture.

4. The pivot block of claim 1 wherein the second securing portion comprises an upwardly extending wall having two spaced apart projections extending therefrom.

5. The pivot block of claim 4 wherein each projection is configured to be secured on a vertical support member of the foldable shelving unit.

6. The pivot block of claim 5 wherein the top edge is configured to transfer the weight of the shelf to the vertical support member in the second position.

7. The pivot block of claim 1 wherein the pivot block is constructed as an integral piece.

8. The pivot block of claim 1 wherein the pivot block is made of aluminum.

9. The pivot block of claim 1 wherein the pivot block is constructed using an aluminum die cast process.

10. The pivot block of claim 1 wherein the spring comprises a gas spring.

11. A pivot block for a foldable shelving unit comprising:
a body having a first end, a second end, a top edge, a bottom edge, and a cutout portion positioned between the top edge and the bottom edge and between the first end and the second end;
a first securing portion located at the first end, the first securing portion comprising a first aperture configured to be secured to a spring;
a second securing portion located at the second end, the second securing portion being generally U-shaped and including two spaced apart outwardly extending projections connected by an upwardly extending wall, each of the outwardly extending projections including a plurality of apertures configured to be secured to a portion of the foldable shelving unit; and
a pivot point located within the cutout portion; and
wherein the pivot block is configured to assist a shelf of the foldable shelving unit to pivot at the pivot point between a first position and a second position.

12. The pivot block of claim 11 further comprising a first face and a second face opposite the first face, wherein the second face is a mirror image of the first face.

13. The pivot block of claim 11 wherein each projection is configured to be secured on a vertical support member of the foldable shelving unit, and wherein the top edge is configured to transfer the weight of the shelf to the vertical support member in the second position.

14. The pivot block of claim 11 wherein the pivot block is constructed using an aluminum die cast process.

15. A foldable shelving unit comprising:
a shelf having a first end, a second end, a top surface, and a bottom surface, the shelf configured to be secured to a support beam by a pivot block;
wherein the pivot block comprises:
a body having a first end, a second end, a top edge, a bottom edge, and a cutout portion positioned between the top edge and the bottom edge;
a first securing portion located at the first end, the first securing portion configured to be secured to a spring;
a second securing portion located at the second end, the second securing portion configured to be secured to the support beam; and
a pivot point located within the cutout portion;
a support member secured to the bottom surface of the shelf;
a hinge secured to the bottom surface of the shelf and to the pivot point of the pivot block;
wherein the pivot block is configured to assist the shelf of the foldable shelving system to pivot at the pivot point between a first position and a second position.

16. The foldable shelving unit of claim 15 further comprising a bracket comprising a first end secured to the support member and a second end secured to the spring.

17. The foldable shelving unit of claim 15 further comprising a cross beam secured to the bottom surface of the shelf.

18. The foldable shelving unit of claim 15 wherein the shelf comprises a notch, the notch being configured to accommodate the support beam when the shelf is in the first and second positions.

19. The foldable shelving unit of claim 15 wherein the support beam is mounted to an interior wall of a vehicle.

20. The foldable shelving unit of claim 19 comprising a plurality of support beams mounted to one or more interior walls of a vehicle, each support beam having a foldable shelving unit secured thereto.

* * * * *